Figure 1:
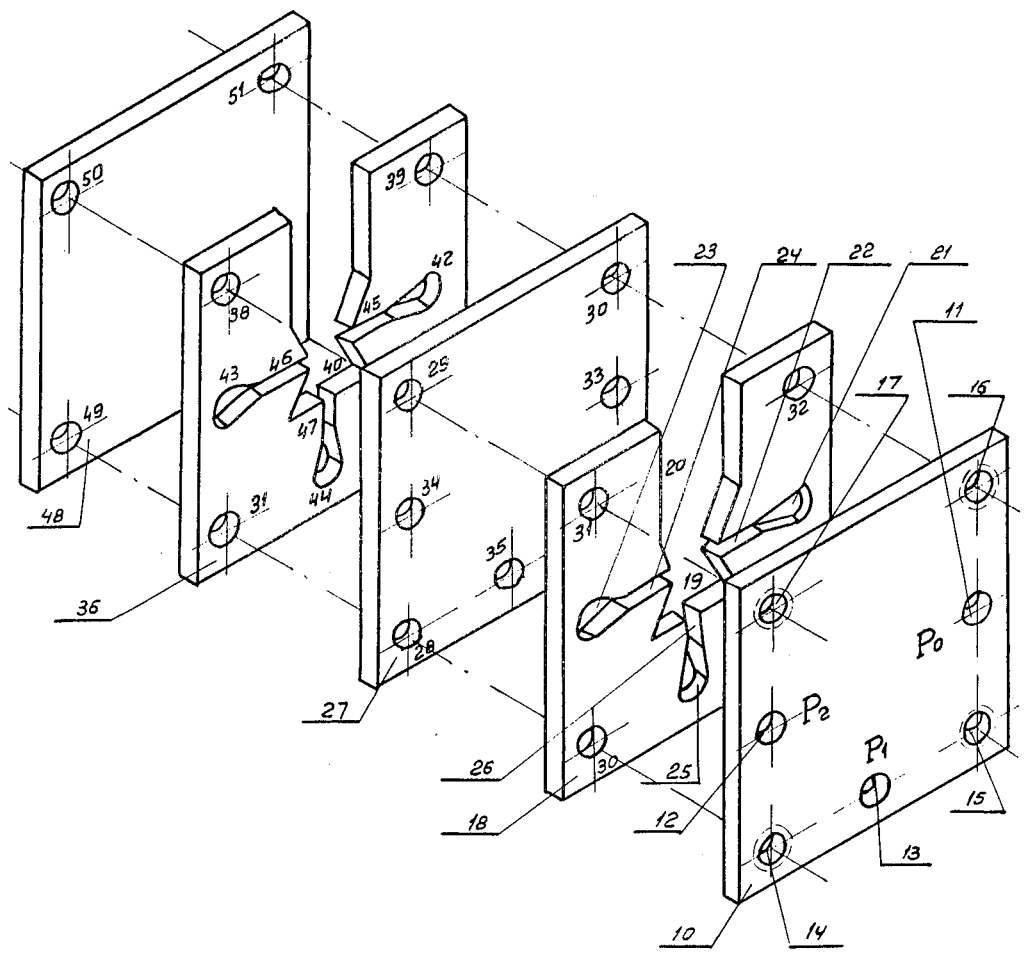

Dec. 28, 1965 J. V. LOOTZOOK 3,225,779
PNEUMATIC OR HYDRAULIC AUTOMATIC CONTROL SYSTEM
Filed Aug. 18, 1961 2 Sheets-Sheet 1

INVENTOR.
J. V. Lootzook
BY
ATTYS.

Dec. 28, 1965    J. V. LOOTZOOK    3,225,779
PNEUMATIC OR HYDRAULIC AUTOMATIC CONTROL SYSTEM
Filed Aug. 18, 1961    2 Sheets-Sheet 2

INVENTOR
J. V. Lootzook
BY
ATTORNEYS

3,225,779
PNEUMATIC OR HYDRAULIC AUTOMATIC CONTROL SYSTEM
Jury Vladimirovich Lootzook, Moscow, U.S.S.R., assignor to Pneumo-Hydraulic Automatic Control Laboratory of Automatic Control and Telemechanics Institute of the Academy of Sciences of the U.S.S.R., Moscow, U.S.S.R.
Filed Aug. 18, 1961, Ser. No. 133,015
2 Claims. (Cl. 137—81.5)

This application is a continuation-in-part of my application Serial No. 10,835 filed February 12, 1960, now abandoned and relates to fluid pressure distribution and more particularly to a device for controlling the pressure of fluid flowing in a conduit in response to variations in pressure in another control fluid.

More specifically, the invention contemplates the practical application of the jet interaction principle for controlling flow of pressure fluid and in which such pressure fluid flows from one recess through an orifice or nozzle and into another nozzle communicating with a second recess with the flow of fluid between the nozzles being deflected in accordance with the pressure of a control fluid flowing from a third recess and through a nozzle in a path intersecting the flow of fluid between the first and second nozzle. Both the fluid to be controlled and the control fluid enter a chamber from their respective nozzles and such chamber communicates with the atmosphere which results in fluid deflected by the control fluid being exhausted to the atmosphere. The device of this invention is incorporated in a relatively simple and economical structure with the recesses, nozzle passages and chambers being formed in a flat plate and with any number of such plates together with cover plates being stacked and clamped together in fluid tight relationship, thereby facilitating manufacture and assembly of the device.

It is accordingly an object of the invention to provide a fluid pressure control device which may be conveniently and economically manufactured from readily available materials and which will serve to adequately control the pressure of fluid flowing through a conduit in response to variations in pressure of a second control fluid.

A further object of the invention is the provision of a fluid pressure control device, including a series of stacked plates clamped together in fluid tight relationship and in which an intermediate plate is provided with recesses, nozzle passages and communication with the atmosphere, such plates being conveniently and economically formed by die stamping operations.

A still further object of the invention is the provision of a fluid pressure control device including a plurality of stacked plates clamped together in fluid tight relationship and in which a single intermediate plate covered by two cover plates provides a single stage pressure control device, the intermediate plate being formed with recesses, nozzle passages, a central chamber and communication between the central chamber and the atmosphere, as well as communication between certain of the recesses and a fluid pressure inlet and outlet connection and another recess communicating with a control fluid source.

Another object of the invention is the provision of a fluid pressure control device including a plurality of stacked plates clamped together in fluid tight relationship and in which two intermediate plates separated by a cover plate are provided with recesses, nozzle passages, a central chamber and communication between the central chamber and the atmosphere and with two of the recesses in each intermediate plate communicating with a fluid pressure inlet and outlet and with the other recess in each plate communicating with a source of control pressure to provide a two-stage control device connected in parallel.

A further object of the invention is the provision of a fluid pressure control device, including a plurality of stacked plates clamped together in fluid tight relationship there being two intermediate plates separated by a cover plate, each of the intermediate plates being provided with recesses, nozzle passages, a central chamber and a communication between the central chamber and the atmosphere, a corresponding recess in each plate being connected to a source of fluid pressure to be controlled, another recess in one plate being connected to a source of control pressure, the third recess in the first plate being connected to the recess for receiving a control pressure in the second plate and the outlet recess in the second plate being connected to a fluid pressure outlet to provide a fluid pressure control device connected in series.

A still further object of the invention is the provision of a fluid pressure control device of relatively simple and economical construction and utilizing the jet interaction principle for controlling the pressure of fluid flowing through a conduit.

Figure 2:
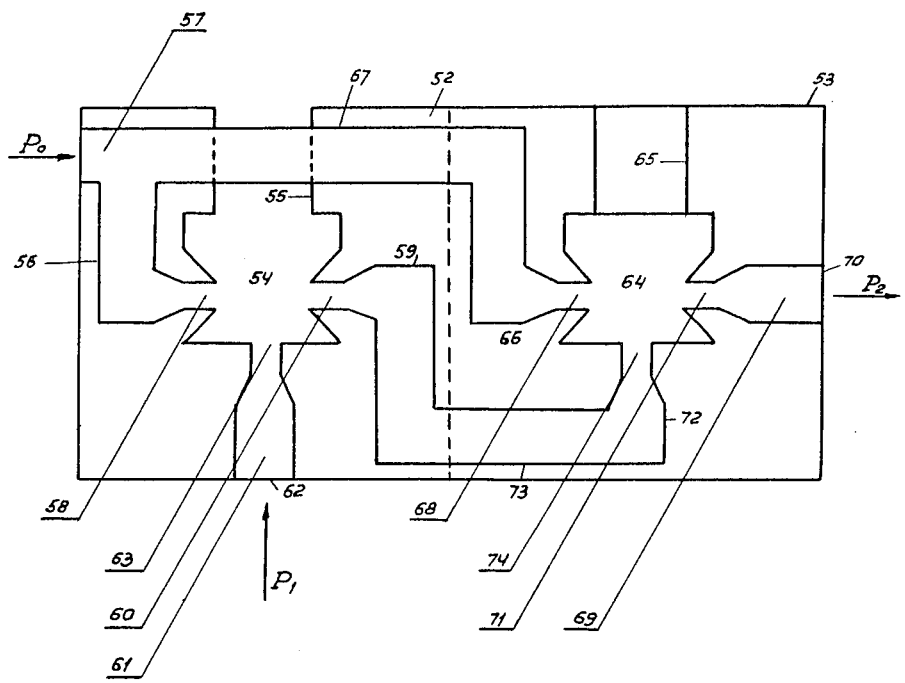
Figure 3:
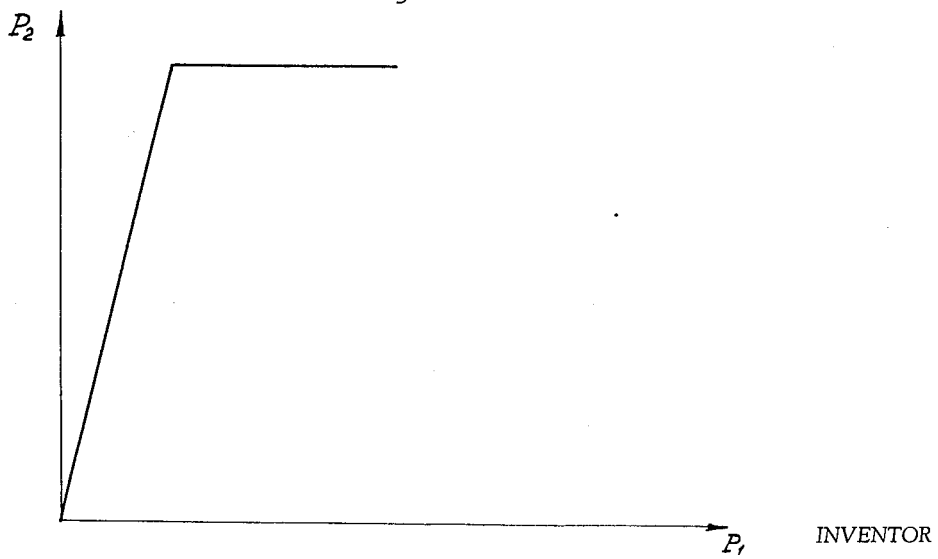

Further objects and advantages of the invention will be apparent from the following description taken in conjunction with the accompanying drawings wherein:

FIG. 1 is an exploded view in perspective showing the structural elements necessary to provide either a single stage fluid pressure control device or a two-stage fluid pressure control device connected in parallel;

FIG. 2 a diagrammatic view showing control elements of the invention connected in a manner to provide a fluid pressure control device connected in series; and FIG. 3 a graph showing the relationship between the pressure of the fluid discharged from the control device of this invention plotted against variations in pressure of the control fluid.

With continued reference to the drawings, there is shown in FIG. 1 the elements required for the construction of a fluid pressure control device in accordance with this invention and which may well comprise a cover plate 10 having flat opposite surfaces and relatively thin in cross section, the plate 10 being provided with an aperture 11 for connection to a source of fluid pressure to be controlled, such pressure being substantially constant and indicated as $P_0$, a second aperture 12 providing an outlet for fluid pressure with the pressure of such fluid designated as $P_2$ and a third aperture 13 for connection to a source of control fluid with the pressure of such control fluid designated as $P_1$. The cover plate 10 may also be provided with suitable apertures 14, 15, 16 and 17 for receiving clamping bolts for a purpose to be presently described.

An intermediate plate 18 of substantially the same size as the cover plate 10 is provided and formed in the intermediate plate 18 is a central chamber 19 which communicates with the atmosphere through a slot 20 in the plate leading from the chamber 19 to the edge of the plate 18. A fluid inlet recess 21 is provided in the intermediate plate 18 and a nozzle passage 22 communicates with the recess 21 and with the central chamber 19 and it is to be noted that in the construction shown the nozzle passage 22 is disposed substantially at right angles to the longitudinal axis of the slot 20. A second recess 23 is formed in the plate 18 and a second nozzle passage 24 substantially in alignment with the first nozzle passage 22, but at the opposite side of the central chamber 19 therefrom communicates with the second recess 23 and the central chamber 10. A third recess 25 is formed in the plate 18 on the opposite side of the chamber 19 from the slot 20 and a third nozzle passage 26 disposed in alignment with the longitudinal axis of the slot 20 and at substantially right angles to the nozzle passages 22 and 23 communicates with the third recess 25 and the central chamber 19.

If it is only desired to provide a single stage fluid pressure control device, second cover plate 27 of substantially the same size as the cover plate 10 and intermediate plate 18 and the cover plate 27 may be provided with apertures 28, 29 and 30 and a fourth aperture, not shown, in alignment with the apertures 14, 15, 16 and 17 in the cover plate 10 and also in alignment with apertures 30, 31 and 32 and a fourth aperture, not shown, in the intermediate plate 18 to receive clamping bolts to clamp the plates 10, 18 and 27 in stacked fluid tight relationship with the recess 21 communicating with the inlet aperture 11, the recess 23 communicating with the outlet aperture 12 and the recess 25 communicating with the control fluid aperture 13.

In the operation of this form of the invention, it is assumed that fluid under substantially constant pressure is admitted to the aperture 11 and flows into the recess 21 from which such fluid flows through the nozzle passage 22 across the central chamber 19 into the nozzle passage 24 and the recess 23 and out through the outlet passage 12. In the absence of any control fluid, the outlet pressure will be substantially equal to the inlet pressure, differing therefrom only as a result of the pressure drop resulting from flow of the fluid through the nozzle passages and central chamber 19. When it is desired to control the pressure at the outlet 12, it is only necessary to apply a control fluid pressure to the inlet 13, which control fluid enters the recess 25 and flows through the nozzle passage 26 into the central chamber 19 at right angles to the flow of fluid between the nozzle passage 22 and nozzle passage 24 resulting in deflecting such flow of fluid into the slot 20 and to the atmosphere, the amount of fluid flowing into the nozzle passage 24 depending upon the pressure of the control fluid and, therefore, the velocity of such control fluid flowing from the nozzle passage 26.

This serves to provide a single stage fluid pressure control device which is extremely simple in construction, but which will effectively operate to provide the desired control.

When it is desired to provide a fluid pressure control device utilizing the principles of this invention and comprising two stages connected in parallel, this result may be accomplished by utilizing the structure above described in addition to which there would be provided apertures 33, 34 and 35 in the cover plate 27 in alignment with the recesses 21, 23 and 25, as well as in alignment with the apertures 11, 12 and 13 in the intermediate plate 18 and cover plate 10, respectively, and in addition there would be provided a second intermediate plate 36 of the same size as the previously described plate and provided with apertures 37, 38 and 39 and a fourth aperture, not shown, in alignment with the apertures in the other plates for receiving suitable clamping bolts. The second intermediate plate 36 is also provided with a central chamber 40 communicating with the atmosphere through a slot 41 in the plate leading from the central chamber 40 to the edge of the plate and the second intermediate plate 36 is further provided with recesses 42, 43 and 44 in alignment with and corresponding to the recesses 21, 23 and 25 of the first intermediate plate 18 and nozzle passages 45, 46 and 47 in the second intermediate plate 36 corresponding to and in alignment with the nozzle passages 22, 24 and 26 in the first intermediate plate 18. A third cover plate 48 of the same size and shape as the other plates and having apertures 49, 50 and 51 and a fourth aperture, not shown, in alignment with the apertures in the other plates for receiving clamping bolts in order to permit all of the plates 10, 18, 27, 36 and 48 to be disposed in stacked relationship and clamped together in a manner to preclude leakage of fluid pressure therebetween.

It will, therefore, be seen that by utilizing the principles of this invention it is extremely convenient and economical to provide a multi-stage fluid pressure control device in which all of the elements may be formed by die stamping operations or in any other convenient and economical manner and, of course, the plates utilized in the apparatus may be of metal or any other suitable material.

With particular reference to FIG. 2, there is shown diagrammatically another form of the invention in which there is provided a two-stage control device connected in series and in which 52 represents one intermediate plate and 53 a second intermediate plate which, of course, will be clamped in stacked fluid pressure tight relationship with a cover plate therebetween substantially in accordance with the form of the invention described above.

The first intermediate plate 52 is provided with a central chamber 54 which communicates with the atmosphere through a slot 55 in the plate leading from the central chamber 54 to the edge of the plate and a recess 56 communicates with an inlet aperture 57. The recess 56 also communicates with the central chamber 54 through a nozzle passage 58 which is disposed substantially at right angles to the slot 55. A second recess 59 is provided in the plate 52 and communicates with the central chamber 54 through a nozzle passage 60 which is substantially in alignment with the nozzle passage 58 and a third recess 61 provided in the plate 52 opposite the slot 55 communicates with an inlet aperture 62 for a control fluid. A third nozzle passage 63 is disposed in axial alignment with the slot 55 and communicates with the central chamber 54 and the third recess 61.

The second intermediate plate 53 is provided with a central chamber 64 which communicates with the atmosphere through a slot 65 in the plate 53 leading from the chamber 64 to the edge of the plate 53 and also provided in the plate 53 is a first recess 66 communicating with the fluid pressure inlet aperture 57 to a suitable passage or conduit 67. A nozzle passage 68 communicates with the recess 66 and the cenrtal chamber 64. A second recess 69 is provided in the second intermediate plate 53, such recess 69 communicating with an outlet aperture 70 and also communicating through a second nozzle passage 71 with the central chamber 64, it being noted that the nozzle passage 71 is substantially in alignment with the nozzle passage 68 and disposed at the opposite side of the central chamber 64 therefrom. A third recess 72 is provided in the second intermediate plate 53 and such recess communicates through a suitable passage or conduit 73 with the recess 59 in the first intermediate plate 52 and the recess 72 also communicates with the central chamber 64 through a nozzle passage 74 which is in alignment with the longitudinal axis of the slot 65 and disposed on the opposite side of the central chamber 64 therefrom.

In the operation of the form of the invention shown in FIG. 2, a fluid pressure to be controlled enters through the apertures 57 into the recess 56 and also into the recess 66 and the pressure of fluid flowing from the nozzle passage 58 and into the nozzle passage 60 is controlled by the pressure of a control fluid entering the recess 61 and flowing through the nozzle passage 63 into the centarl chamber 54. The pressure fluid flowing from the recess 59 through the conduit or passage 73 into the recess 72 of the second intermediate plate 53 provides a control fluid for controlling the pressure of fluid flowing from the recess 66 through the nozzle passage 68 into the nozzle passage 71 and the recess 69 in the second intermediate plate 73, by which structure the pressure of fluid flowing from the recess 69 through the outlet aperture 70 is controlled by the fluid flowing from the outlet recess of the first intermediate plate 52. In this manner there is provided a two-stage fluid pressure control device connected in series.

FIG. 3 is incorporated in the drawing largely to show, but with small variations in the pressure of the control fluid as designed by $P_1$, there are relatively large variations in outlet pressure of the fluid to be controlled as indicated by $P_2$.

It will, therefore, be seen that by the above described invention there has been provided a relatively simple fluid pressure control device which may be conveniently and economically manufactured by rapid and economical machining operations, such as by die stamping, thereby permitting the provision of a highly effective fluid pressure control device at a relatively low cost.

It will be obvious to those skilled in the art that various changes may be made in the invention without departing from the spirit and scope thereof and therefore the invention is not limited by that which is shown in the drawing and described in the specification, but only as indicated in the appended claims.

I claim:

1. A fluid pressure control device comprising a cover plate, said cover plate having an aperture for attachment to a source of constant pressure fluid, said cover plate having a second aperture providing a fluid pressure outlet, said cover plate having a third aperture for attachment to a source of control fluid pressure, an intermediate plate, a central chamber in said intermediate plate, a slot in said intermediate plate leading from said chamber to the edge of said intermediate plate to provide communication with the atmosphere, a recess in said intermediate plate communicating with said first aperture, a nozzle passage communicating with said recess and said chamber and disposed at an angle to said slot, a second recess in said intermediate plate communicating with said second aperture, a second nozzle passage in alignment with said first nozzle passage and communicating with said second recess and said chamber, a third recess in said intermediate plate on the opposite side of said chamber from said slot and communicating with said third aperture, a third nozzle passage disposed in alignment with said slot and at an angle to said first and second nozzle passages and communicating with said third recess and said chamber, a second cover plate in engagement with said intermediate plate and having apertures in alignment with said first, second and third apertures, a second intermediate plate in engagement with said second cover plate, a central chamber, slot, recesses and nozzle passages in said second intermediate plate duplicating those in said first intermediate plate and with the recesses in said second intermediate plate communicating with the apertures in said second cover plate, a third cover plate in engagement with said second intermediate plate, and means to clamp all of said plates in staked fluid-tight relationship to provide a multi-stage parallel control device, whereby pressure control fluid flowing from said third nozzle passages will deflect fluid flowing from said first nozzle passages across said chambers into said slots in accordance with the pressure of said control fluid to control the quantity of fluid flowing from said chambers into said second nozzle passages and the pressure of fluid flowing from said second recesses through said second apertures.

2. A fluid pressure control device comprising a cover plate, said cover plate having an aperture or attachment to a source of constant pressure fluid, said cover plate having a second aperture for attachment to a source of control fluid pressure, an intermediate plate, a central chamber in said intermediate plate, a slot in said intermediate plate leading from said chamber to the edge of said intermediate plate to provide communication with the atmosphere, a recess in said intermediate plate communicating with said first aperture, a nozzle passage communicating with said recess and said chamber and disposed at an angle to said slot, a second recess in said intermediate plate on the opposite side of said chamber from said slot and communicating with said second aperture, a second nozzle passage disposed in alignment with said slot and at an angle to said first nozzle passage and communicating with said second recess and said chamber, a third recess in said intermediate plate, a third nozzle passage in alignment with said first nozzle passage and communicating with said third recess and said chamber, a second cover plate in engagement with said intermediate plate and having an aperture communicating with said first recess and said first aperture in said first cover plate, a second intermediate plate in engagement with said second cover plate, a central chamber, slot, recesses and nozzle passages in said second intermediate plate duplicating those in said said first intermediate plate, the first recess in said second intermediate plate communicating with the aperture in said second cover plate, means providing communication between the third recess in said first intermediate plate and the second recess in said second intermediate plate, a third cover plate in engagement with said second intermediate plate, said third cover plate having an aperture communicating with said third recess in said second intermediate plate to provide a fluid pressure outlet, and means to clamp all of said plates in stacked fluid-tight relationship to provide a multi-stage series control device.

References Cited by the Examiner

UNITED STATES PATENTS

| | | | |
|---|---|---|---|
| 2,727,525 | 12/1955 | Harris | 251 |
| 2,889,856 | 6/1959 | Magnuson. | |
| 3,001,698 | 9/1961 | Warren | 137—83 |
| 3,024,805 | 3/1962 | Horton | 137—597 |
| 3,057,551 | 10/1962 | Etter | 251—367 XR |

ISODOR WEIL, *Primary Examiner.*